United States Patent
Christy

(10) Patent No.: US 12,208,530 B2
(45) Date of Patent: Jan. 28, 2025

(54) WELD ANGLE CORRECTION DEVICE

(71) Applicant: Lincoln Global, Inc., Santa Fe Springs, CA (US)

(72) Inventor: Zachary A. Christy, Fort Collins, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 272 days.

(21) Appl. No.: 17/978,342

(22) Filed: Nov. 1, 2022

(65) Prior Publication Data

US 2023/0390934 A1 Dec. 7, 2023

Related U.S. Application Data

(60) Provisional application No. 63/349,180, filed on Jun. 6, 2022.

(51) Int. Cl.
*B25J 9/00* (2006.01)
*B23K 37/02* (2006.01)
(Continued)

(52) U.S. Cl.
CPC ......... *B25J 9/1697* (2013.01); *B23K 37/0229* (2013.01); *B25J 9/1664* (2013.01);
(Continued)

(58) Field of Classification Search
CPC ...... B25J 9/1697; B25J 9/1664; B25J 11/005; B25J 13/08; B25J 9/1679; B25J 9/1684;
(Continued)

(56) References Cited

U.S. PATENT DOCUMENTS

| | | |
|---|---|---|
| 4,118,620 A | 10/1978 | Wall, Jr. et al. |
| 4,750,663 A | 6/1988 | Warczak |

(Continued)

FOREIGN PATENT DOCUMENTS

| | | |
|---|---|---|
| CN | 104128692 A | 11/2014 |
| CN | 110524581 A | 12/2019 |

(Continued)

OTHER PUBLICATIONS

Ryberg, et al.; "Stereo Vision for Path Correction in Off-Line Programmed Robot Welding;" 2010 IEEE International Conference on Industrial Technology; Dated Mar. 14, 2010; pp. 1700-1705.

(Continued)

*Primary Examiner* — Ian Jen
(74) *Attorney, Agent, or Firm* — David J. Muzilla

(57) ABSTRACT

A method of correcting angles of a welding torch positioned by a user while training a robot of a robotic welding system is provided. Weldment depth data of a weldment and a corresponding weld seam is acquired and 3D point cloud data is generated. 3D plane and intersection data is generated from the 3D point cloud data, representing the weldment and weld seam. User-placed 3D torch position and orientation data for a recorded weld point along the weld seam is imported. A torch push angle and a torch work angle are calculated for the recorded weld point, with respect to the weldment and weld seam, based on the user-placed torch position and orientation data and the 3D plane and intersection data. The torch push angle and the torch work angle are corrected for the recorded weld point based on pre-stored ideal angles for the weld seam.

20 Claims, 10 Drawing Sheets

(51) Int. Cl.
  *B25J 9/16* (2006.01)
  *B25J 11/00* (2006.01)
  *B25J 13/08* (2006.01)
  *G06T 7/593* (2017.01)

(52) U.S. Cl.
  CPC ............. *B25J 11/005* (2013.01); *B25J 13/08* (2013.01); *G06T 7/593* (2017.01); *G05B 2219/39001* (2013.01); *G05B 2219/45104* (2013.01); *G06T 2207/10028* (2013.01); *G06T 2207/30136* (2013.01)

(58) Field of Classification Search
  CPC ............. B23K 37/0229; G06T 7/593; G06T 2207/10028; G06T 2207/30136; G05B 2219/39001; G05B 2219/45104; G05B 19/42; G05B 2219/39137
  See application file for complete search history.

(56) References Cited

U.S. PATENT DOCUMENTS

| | | | |
|---|---|---|---|
| 5,014,183 A | 5/1991 | Carpenter et al. | |
| 5,465,037 A | 11/1995 | Huissoon et al. | |
| 5,799,135 A | 8/1998 | Terawaki | |
| 5,841,104 A | 11/1998 | Svensson | |
| 5,845,053 A | 12/1998 | Watanabe et al. | |
| 6,362,456 B1 | 3/2002 | Ludewig et al. | |
| 7,962,967 B2 * | 6/2011 | Becker | B23K 9/322 2/8.8 |
| 9,352,411 B2 * | 5/2016 | Batzler | G09B 19/24 |
| 9,833,857 B2 | 12/2017 | Artelsmair | |
| 10,152,034 B2 | 12/2018 | Komatsu et al. | |
| 11,407,110 B2 | 8/2022 | Lonsberry et al. | |
| 2005/0149231 A1 | 7/2005 | Pretlove et al. | |
| 2005/0256611 A1 | 11/2005 | Pretlove et al. | |
| 2016/0114418 A1 | 4/2016 | Jones et al. | |
| 2016/0375524 A1 | 12/2016 | Hsu | |
| 2020/0078945 A1 | 3/2020 | Sun et al. | |
| 2020/0114449 A1 | 4/2020 | Chang et al. | |
| 2020/0139474 A1 | 5/2020 | Mayer et al. | |
| 2021/0138646 A1 | 5/2021 | Matsushima | |
| 2022/0152720 A1 | 5/2022 | Hazui et al. | |
| 2023/0088582 A1 | 3/2023 | Uchikata et al. | |

FOREIGN PATENT DOCUMENTS

| | | |
|---|---|---|
| CN | 113119122 A | 7/2021 |
| CN | 114055781 A | 2/2022 |
| CN | 114505560 A | 5/2022 |
| CN | 114515924 A | 5/2022 |
| CN | 114799521 A | 7/2022 |
| CN | 114839995 A | 8/2022 |
| CN | 218426128 U | 2/2023 |
| EP | 2 375 298 A2 | 10/2011 |
| JP | S55-136575 A | 10/1980 |
| JP | H0-5123866 A | 5/1993 |
| JP | H06-79459 A | 3/1994 |
| JP | H08-118022 A | 5/1996 |
| JP | 2009-119525 A | 6/2009 |
| JP | 5103147 B2 | 12/2012 |
| JP | 2014-231137 A | 12/2014 |
| KR | 1998-0026434 A | 7/1998 |
| KR | 10-0454472 B1 | 12/2004 |
| TW | I622451 B | 5/2018 |
| WO | 2022/016152 A1 | 1/2022 |

OTHER PUBLICATIONS

Extended European Search Report for Corresponding Application No. 23177412.6; Dated Oct. 31, 2023; pp. 1-14.
Extended European Search Report for Corresponding Application No. 23177416.7; Dated Nov. 6, 2023; pp. 1-16.
Extended European Search Report for Corresponding Application No. 23177415.9; Dated Nov. 8, 2023; pp. 1-14.
Vectis Automation; "MultiPass Feature on the Vectis Cobot Welding Tool;" https://www.youtube.com/watch?v=q0XW1 iVjOI0; Online Publication Date Dec. 12, 2020; pp. 1-2.
Extended European Search Report for corresponding European Application No. 23177414.2; Dated Feb. 21, 2024; pp. 1-15.

* cited by examiner

WELD ANGLE CORRECTION DEVICE

CROSS REFERENCE TO RELATED APPLICATION/INCORPORATION BY REFERENCE

This U.S. Patent Application claims priority to and the benefit of U.S. Provisional Patent Application Ser. No. 63/349,180 filed on Jun. 6, 2022, which is incorporated herein by reference in its entirety. U.S. Published Patent Application No. 2020/0139474 A1 is incorporated herein by reference it its entirety. U.S. Pat. No. 9,833,857 B2 is incorporated herein by reference in its entirety.

FIELD

Embodiments of the present invention relate to the use of robots (e.g., collaborative robots or cobots) for welding or cutting. More specifically, embodiments of the present invention relate to a welding angle correction tool and method for correcting recorded robot welding/cutting torch orientations as positioned by a human user when training a robot to traverse a weld joint.

BACKGROUND

Programming motion trajectories of a robot (e.g., a collaborative robot) prior to actual welding or cutting can be quite complicated. In addition to the challenges associated with programming a weld trajectory along a weld joint, other challenges exist that are associated with setting and programming angles and orientations of a welding or cutting torch at points along the trajectory.

SUMMARY

A robotic welding or cutting system is configured to allow a human user to train a robot of the system by positioning a welding or cutting torch attached to an arm of the robot at various points along a joint/seam of a weldment to be welded or cut. The user moves the arm of the robot to position a tip of the torch at a desired point along the joint/seam and the point is recorded by the robot controller (i.e., the robot controller records the spatial coordinates and angular orientations of the torch at the point). In accordance with an embodiment of the present invention, the user does not have to be particularly careful about how the angles (e.g., a push angle and a work angle) of the torch are positioned by the user with respect to the weldment and corresponding joint/seam. The weld angle correction tool includes a depth camera that acquires stereoscopic depth image data which is used to determine the actual torch angles of the torch, as positioned by the user, with respect to the joint/seam. Once the user has positioned the torch and recorded the corresponding desired points along the joint, the user can activate a weld angle correction tool to select a recorded point and make corrections to the recorded parameters (e.g., push angle and work angle) associated with that point.

In one embodiment, a method of correcting angles of a welding torch positioned by a user while training a robot of a robotic welding system is provided. Stereoscopic image data of a weldment and a corresponding weld seam is acquired and 3D point cloud data is generated. 3D plane and intersection data is generated from the 3D point cloud data, representing the weldment and weld seam. User-placed 3D torch position and orientation data for a recorded weld point along the weld seam is imported. A torch push angle and a torch work angle are calculated for the recorded weld point, with respect to the weldment and weld seam, based on the user-placed torch position and orientation data and the 3D plane and intersection data. The torch push angle and the torch work angle are corrected for the recorded weld point based on pre-stored ideal angles for the weld seam.

In one embodiment, a method of correcting angles of a welding torch positioned by a user while training a robot of a robotic welding system is provided. The method includes acquiring weldment depth data of a weldment and a corresponding weld seam using a depth camera of a weld angle correction tool, and processing the weldment depth data using a computer of the weld angle correction tool. In one embodiment, the weldment depth data is stereoscopic image data. In one embodiment, the computer of the weld angle correction tool uses matrix manipulation techniques, point cloud manipulation techniques, and feature recognition techniques as part of processing the weldment depth data. The method also includes importing user-placed 3D torch position and orientation data to the computer of the weld angle correction tool from a robot controller of a robotic welding system in a robot coordinate space for a recorded weld point along the corresponding weld seam. The method further includes calculating, using the computer of the weld angle correction tool, at least one torch angle for the recorded weld point with respect to the weldment and the corresponding weld seam in the robot coordinate space based on the weldment depth data of the weldment and the corresponding weld seam, as processed by the computer of the weld angle correction tool, and the user-placed 3D torch position and orientation data. The method also includes correcting the at least one torch angle for the recorded weld point based on pre-stored ideal angles for the weldment and the corresponding weld seam. In one embodiment, the processing of the weldment depth data includes generating 3D point cloud data from the stereoscopic image data in the robot coordinate space using the computer of the weld angle correction tool. In one embodiment, the processing of the weldment depth data includes generating 3D plane and intersection data representative of the weldment and the corresponding weld seam from the 3D point cloud data in the robot coordinate space using the computer of the weld angle correction tool. The torch angle may include, for example, a torch push angle and/or a torch work angle. In one embodiment, the weldment depth data is transmitted via at least one of a wired or a wireless means from the depth camera to the computer of the weld angle correction tool. In one embodiment, the user-placed 3D torch position and orientation data is transmitted via at least one of a wired or a wireless means from the robot controller to the computer of the weld angle correction tool. In one embodiment, a position of the depth camera is calibrated to one of a tip of the welding torch or a tool center point (TCP) of the robot.

In one embodiment, a weld angle correction tool for correcting angles of a welding torch positioned by a user while training a robot of a robotic welding system is provided. The weld angle correction tool includes a depth camera configured to acquire weldment depth data of a weldment and a corresponding weld seam to be welded by a robotic welding system having a welding torch. The weld angle correction tool also includes a computer device configured to receive the weldment depth data from the depth camera, and user-placed 3D torch position and orientation data from a robot controller of the robotic welding system for a recorded weld point along the corresponding weld seam. The computer device is further configured to calculate at least one torch angle of the welding torch for the recorded weld point with respect to the weldment and the corresponding weld seam in a coordinate space of the robotic welding system based on the weldment depth data and the user-placed torch position and orientation data. The computer device is also configured to calculate at least one corrected torch angle based on the at least one torch angle for the recorded weld point, as calculated, and pre-stored ideal angles for the weldment and the corresponding weld seam. In one embodiment, the weldment depth data is stereoscopic image data. In one embodiment, the depth camera includes two imaging apertures for acquiring the stereoscopic image data. In one embodiment, calculating of the at least one torch angle using the computer device includes generating 3D point cloud data from the stereoscopic image data in the coordinate space of the robotic welding system. In one embodiment, calculating of the at least one torch angle using the computer device includes generating 3D plane and intersection data representative of the weldment and the corresponding weld seam from the 3D point cloud data in the coordinate space of the robotic welding system. In one embodiment, the computer device is in the form of a laptop computer. In one embodiment, the computer device is integrated into the robot controller of the robotic welding system. In one embodiment, the computer device is integrated into a welding power supply of the robotic welding system. In one embodiment, the depth camera is configured to be removably attached to the welding torch. In one embodiment, the depth camera is configured to be mounted on joint 6 of a robot arm of the robotic welding system.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
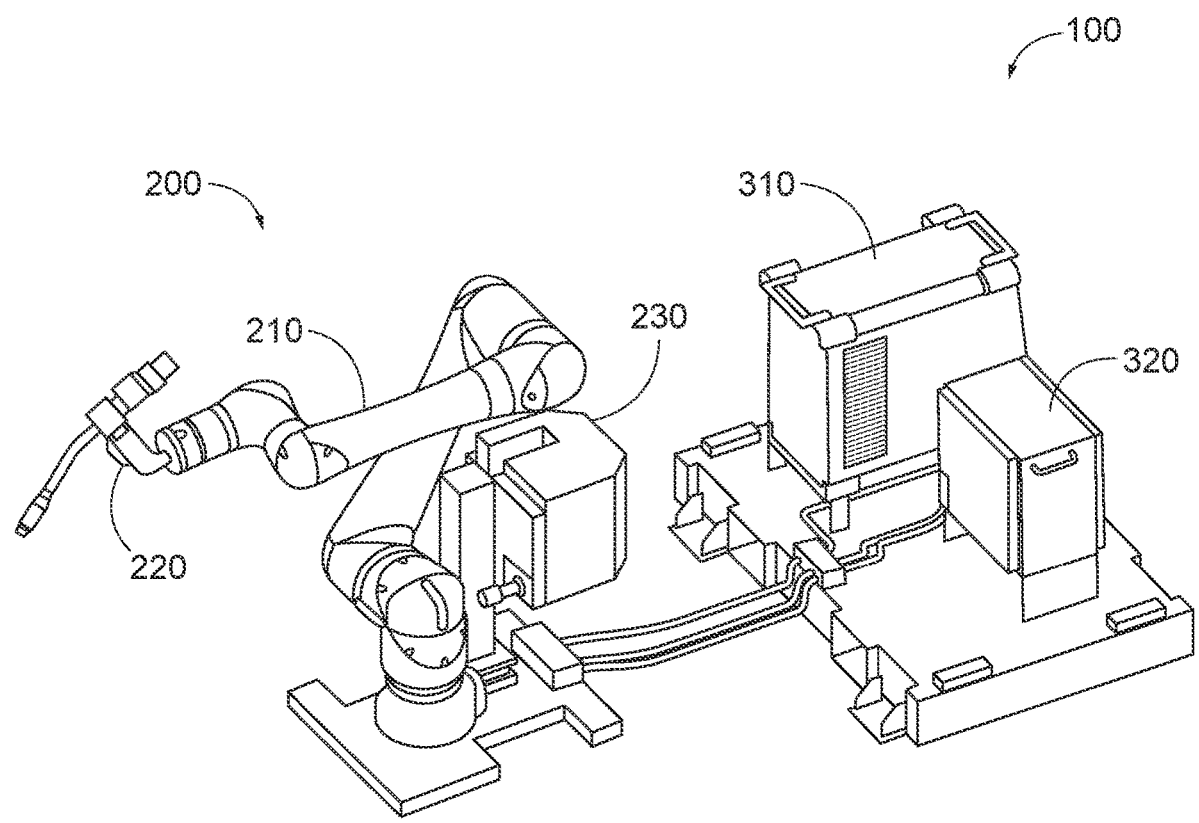
FIG. 1 illustrates one embodiment of a welding system having a robot (e.g., a collaborative robot)

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates one embodiment of a welding system 100 having a robot portion 200 (e.g., a collaborative robot). Although the discussion herein focuses on a welding system, the inventive concepts herein can apply equally well to a cutting system (e.g., a robotic plasma cutting system). Referring to FIG. 1, the welding system 100 includes a robot portion 200, a welding power supply 310, and a robot controller 320. The robot portion 200 has an arm 210 configured to hold a welding torch (e.g., a welding gun) 220. The terms "torch" and "gun" are used herein interchangeably. The robot portion 200 also includes a servo-mechanism apparatus 230 configured to move the arm 210 of the robot portion 200 under the command of the robot controller 320. In one embodiment, the welding system 100 includes a wire feeder (not shown) to feed consumable welding wire to the welding torch 220.

Figure 2:
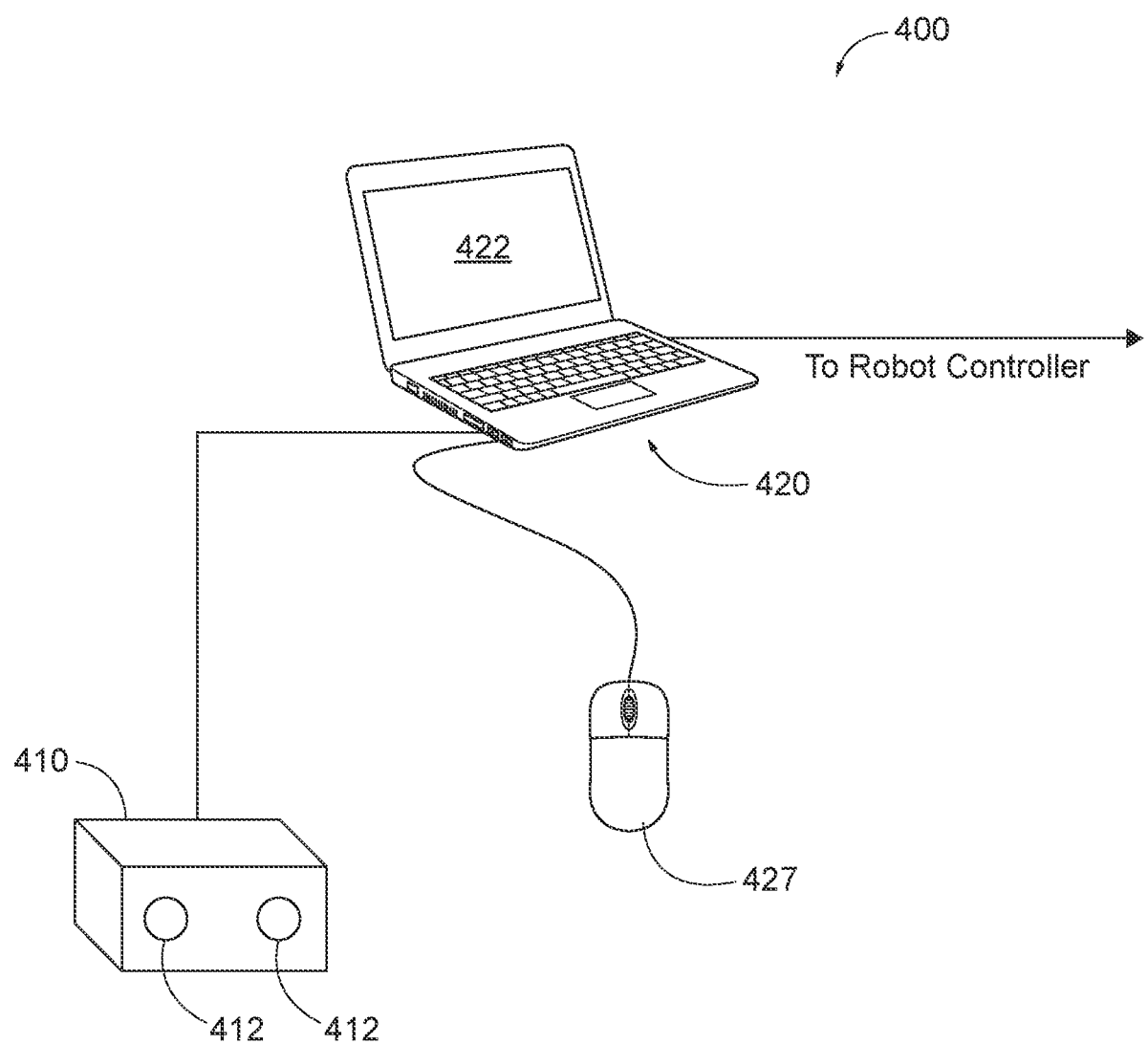
FIG. 2 illustrates one embodiment of a weld angle correction tool.

FIG. 2 illustrates one embodiment of a weld angle correction tool 400. The weld angle correction tool 400 includes a depth camera 410 and a computer device (e.g., a lap top computer 420). The depth camera 410 has two imaging apertures 411 and 412 and is configured to acquire stereoscopic image data. The stereoscopic image data allows the depths of points in space to be determined. The stereoscopic image data is transmitted (via wired or wireless means) from the depth camera 410 to the laptop computer 420. As discussed later herein, the laptop computer 420 is programmed to convert the stereoscopic image data to 3D point cloud data, and then generate 3D plane/intersection data from the 3D point cloud data in the coordinate space of the robot (the robot coordinate space). In other embodiments, an alternative coordinate space may be defined and used.

When the user positions the robot arm 210 having the welding torch 220 connected thereto at a desired weld point of a weld joint/seam of a weldment (work piece), the robot controller 320 records the corresponding torch position and orientation data. The terms "weldment" and "work piece"

are used interchangeably herein. The robot controller 320 transmits (via wired or wireless means) the user-placed torch position and orientation data, in the coordinate space of the robot, to the laptop computer 420. In accordance with other embodiments, the laptop computer 420 may be some other type of computer device or controller (e.g., having at least one processor) in some other form. In one embodiment, the functionality of the laptop computer may be integrated into the robot controller 320, or in another embodiment, into the welding power supply 310.

Figure 3:
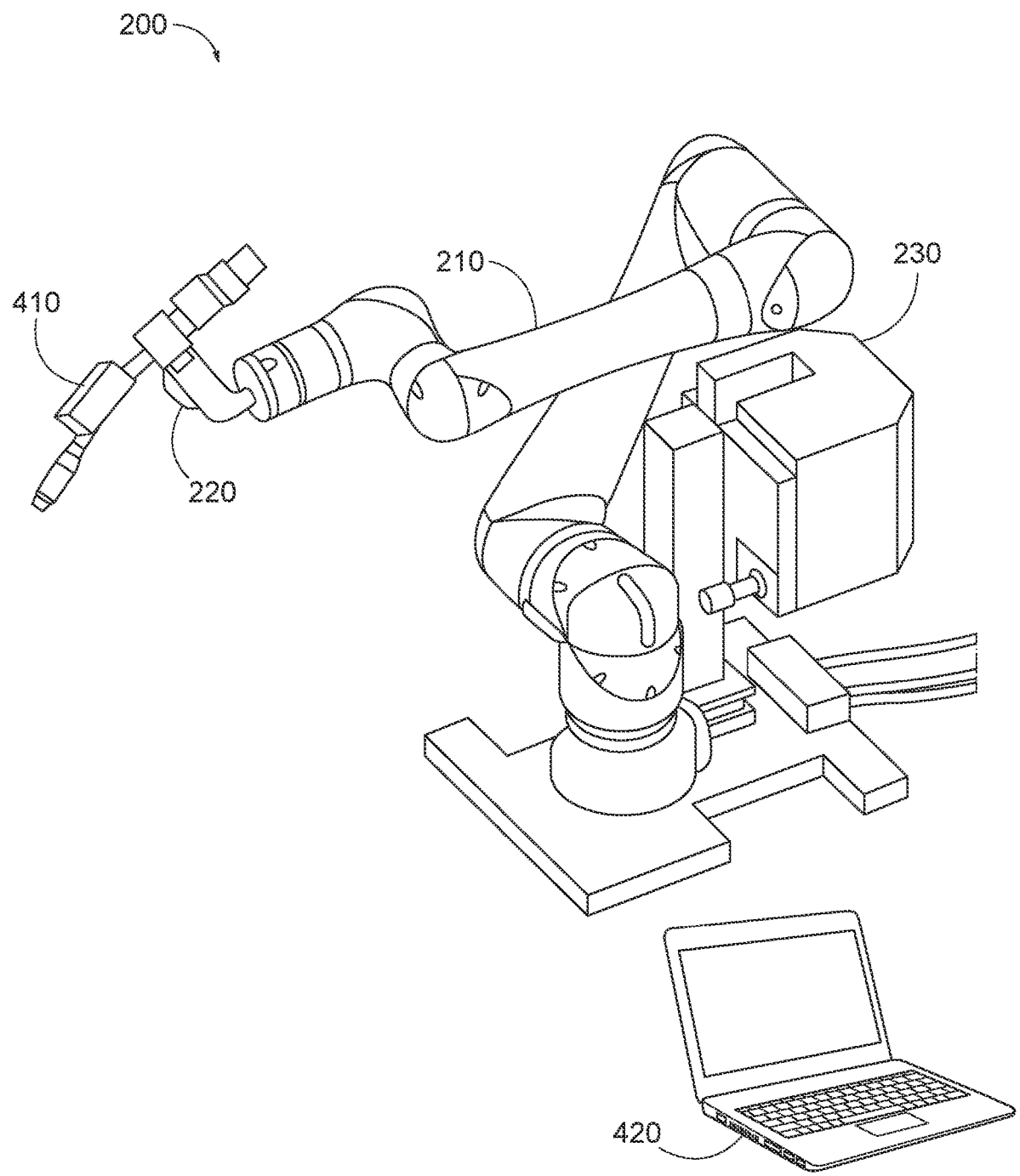
FIG. 3 illustrates a robot portion of the welding system of FIG. 1 operatively integrated with the weld angle correction tool of FIG. 2.

FIG. 3 illustrates a robot portion 200 of the welding system 100 of FIG. 1 operatively integrated with the weld angle correction tool 400 of FIG. 2. In the embodiment of FIG. 3, the depth camera 410 is mounted (e.g., removably attached to) the welding torch 220 behind a gas nozzle of the welding torch 220. In this manner, when the welding torch 220 is positioned at a desired weld point at a weld joint/seam of a weldment, the field of view of the depth camera 410 will include the weld point and a portion of the weldment (along with its weld joint/seam) surrounding the weld point. In another embodiment, the depth camera 410 may be mounted on joint 6 of the robot arm 210 (near a distal end of the robot arm 210). Other mounting positions are possible as well, in accordance with other embodiments. In the embodiment of FIG. 3, the laptop computer 420 communicates wirelessly (e.g., via Bluetooth® or Wi-Fi) with the depth camera 410 and the robot controller 320. In accordance with one embodiment, the position of the depth camera 410 is calibrated to, for example, the tip of the torch or a tool center point (TCP) of the robot (e.g., using an eye-hand calibration software). The depth camera 410 may be "hardened" to survive the welding environment.

Figure 4:
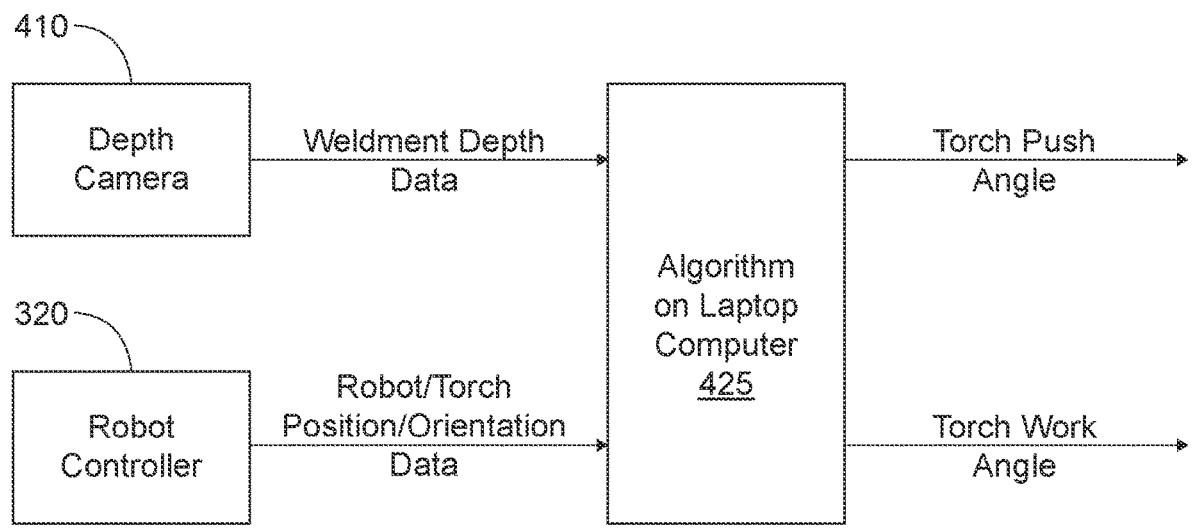
FIG. 4 illustrates a schematic block diagram of data inputs to and data outputs from an algorithm of the weld angle correction tool of FIG. 2 when operating with the welding system of FIG. 1.

FIG. 4 illustrates a schematic block diagram of data inputs to and data outputs from an algorithm 425 (or a set of algorithms or processes implemented in software and/or hardware) on the laptop computer 420 of the weld angle correction tool 400 of FIG. 2 when operating with the welding system 100 of FIG. 1. The algorithm 425 operates on two sets of input data being that of weldment joint/seam stereoscopic image data (depth data) from the depth camera 410 and robot torch position and orientation data from the robot controller 320. The algorithm 425 is programmed to convert the depth data to 3D point cloud data, and then generate 3D plane/intersection data from the 3D point cloud data in the coordinate space of the robot, for example. In accordance with one embodiment, the algorithm 425 uses matrix manipulation techniques, point cloud manipulation techniques, and feature recognition techniques. Upon operating on the two sets of input data (the depth data and the torch position/orientation data), the algorithm 425 generates a torch push angle and a torch work angle with respect to the weld joint/seam in the coordinate space of the robot. One skilled in the art of arc welding will understand the concepts of a torch push angle and a torch work angle.

The acquired depth data (in a single stereoscopic image) allows the weld angle correction tool 400 to determine, in three-dimensional detail, characteristics of the weldment joint/seam (i.e., what the geometry of weldment joint/seam looks like). Processing of the acquired depth data eliminates any need to use a touch-sensing technique to determine the geometry of the weldment joint/seam. Also, the robot controller 320 "knows" the recorded position and orientation of the torch with respect to the robot coordinate system, but not with respect to the position and orientation of the weldment/ work piece. Together, both the depth data and the robot torch position/orientation data allow the actual torch angles, as positioned by the user, to be determined. Other torch parameters (e.g., a stickout distance) may be determined from the weldment joint/seam depth data and/or the robot torch position/orientation data, in accordance with other embodiments.

Figure 5A:
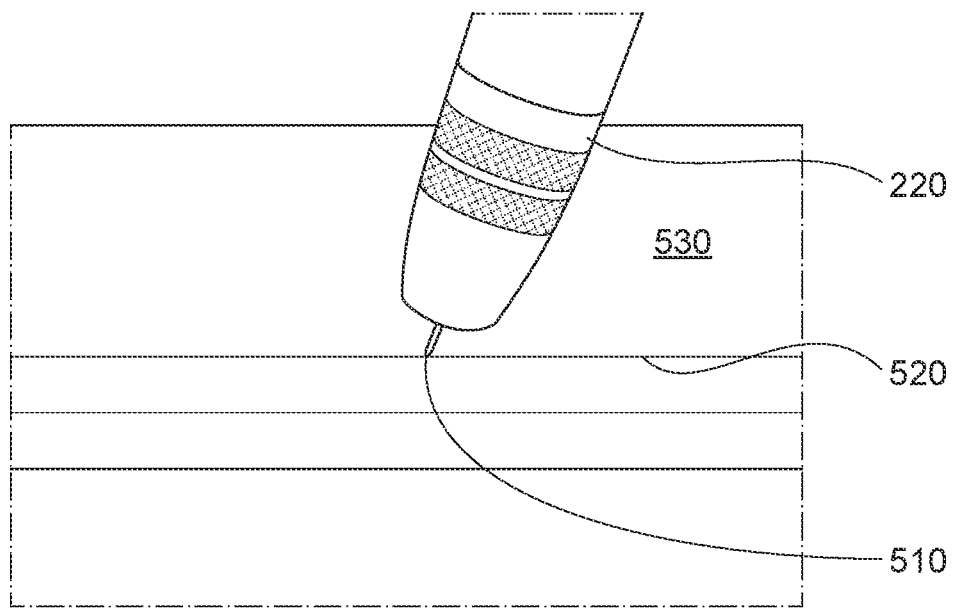
FIG. 5A illustrates a welding torch of the welding system that has been positioned by a user at a desired weld point at a joint/seam of a work piece at a non-ideal push angle.
Figure 5B:
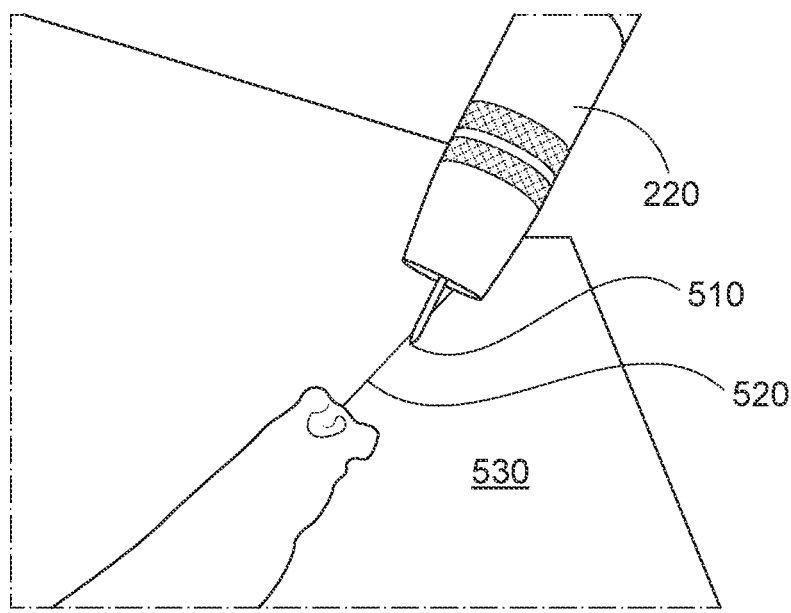
FIG. 5B illustrates the welding torch of FIG. 5A that has been positioned by the user at the desired weld point of the joint/seam of the work piece at a non-ideal work angle.

As an example, FIG. 5A illustrates a welding torch 220 of the welding system 100 that has been positioned by a user at a desired weld point 510 (which is recorded by the robot controller 320) at a joint/seam 520 of a work piece (weldment) 530. The welding torch is at a non-ideal push angle. Similarly, FIG. 5B illustrates the welding torch 220 of FIG. 5A that has been positioned by the user at the desired weld point 510 of the joint/seam 520 of the work piece 530 at a non-ideal work angle.

Figure 6:
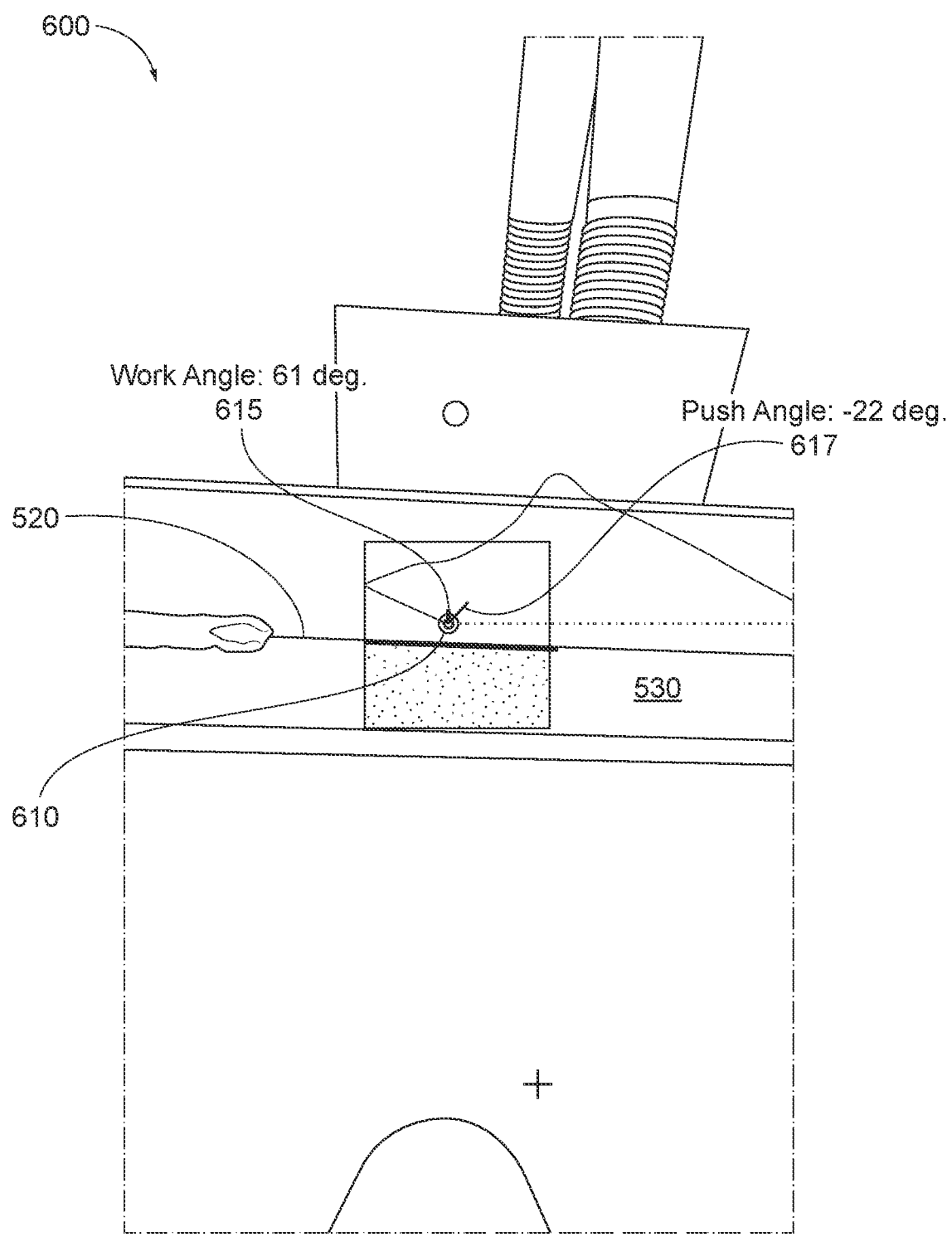
FIG. 6 illustrates a camera view, provided by the weld angle correction tool of FIG. 2, of the work piece and corresponding joint/seam showing the non-deal angles of the welding torch, before angle correction, in an augmented reality manner.

In one embodiment, the depth camera 410 is also configured to provide a regular camera view (e.g., using only one image aperture of the two image apertures of the depth camera 410). For example, FIG. 6 illustrates a camera view 600 (provided by the weld angle correction tool 400 of FIG. 2 via the camera 410) of the work piece 530 and the corresponding joint/seam 520 showing the non-ideal angles of the welding torch 220, in an augmented reality manner, before angle correction has been performed. The camera view 600 is displayed on a display device 422 of the laptop computer 420. The AR reticle symbol 610 shows the location of the recorded weld point 510 with respect to the work piece 530 and the corresponding joint/seam 520. The work angle (represented by AR symbol 615) of the welding torch 220 (as positioned by the user and computed by the algorithm 425) is 61 degrees (non-ideal). The push angle (represented by AR symbol 617) of the welding torch 220 (as positioned by the user and computed by the algorithm 425) is −22 degrees (non-ideal). In this manner, a user can view the camera view 600 on a display device 422 of the laptop computer 420 along with AR symbols 610, 615, and 617 representing the weld point 510 and the non-ideal work and push angles. The computer 420 is configured (e.g., via hardware and software) to command the displaying of the various augmented reality symbols on the display device 422.

Figure 7:
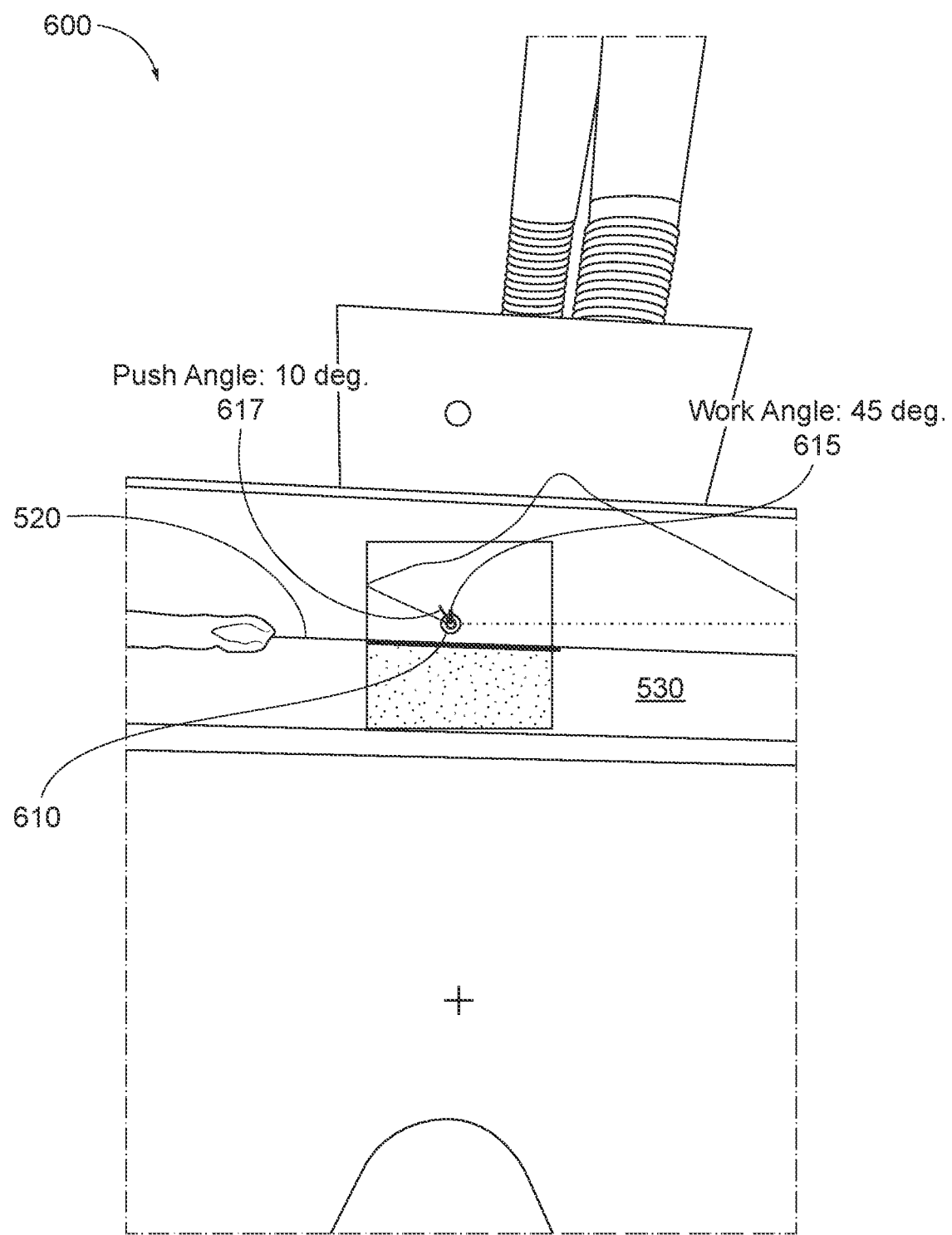
FIG. 7 illustrates the camera view, provided by the weld angle correction tool of FIG. 2, of the work piece and corresponding joint/seam showing the corrected/ideal angles of the welding torch, after angle correction, in an augmented reality manner.

FIG. 7 illustrates the camera view 600, provided by the weld angle correction tool 400 of FIG. 2, of the work piece 530 and the corresponding joint/seam 520 showing the corrected angles of the welding torch 220, in an augmented reality manner, after angle correction. For example, in one embodiment, the user selects the reticle symbol 610 in the camera view 600 (e.g., using a user interface 427 (e.g., a computer keyboard or a computer mouse) of the laptop computer 420. The user then commands the system (e.g., via a CNTL F command on the keyboard of the laptop computer 420) to correct the push angle and the work angle of the welding torch 220 at the weld point 510 to the ideal angles for the type of work piece 530 and joint/seam 520 with respect to the characteristics of the work piece 530 and joint/seam 520 (as characterized by the weld angle correction tool 400). The AR symbology now shows the corrected work angle symbol 615 representing 45 degrees, and the corrected push angle symbol 617 representing 10 degrees in FIG. 7.

The robot controller 320 "knows" the type of work piece and joint/seam. For example, in one embodiment, the work angle correction tool 400 determines the type of work piece and joint/seam from the 3D point cloud data and informs the robot controller 320. The ideal angles are computed by the computer 420 of the weld angle correction tool 400 based on at least the weldment depth data, in one embodiment. In another embodiment, the type of work piece and joint/seam (along with ideal angles) is pre-stored in the robot controller

320. The laptop computer 420 communicates with the robot controller 320, and the robot controller 320 changes the recorded work angle (with respect to the work piece and joint/seam) to the ideal work angle of 45 degrees, and the recorded push angle (with respect to the work piece and joint/seam) to the ideal push angle of 10 degrees (as seen in the camera view 600 of FIG. 7).

Figure 8A:
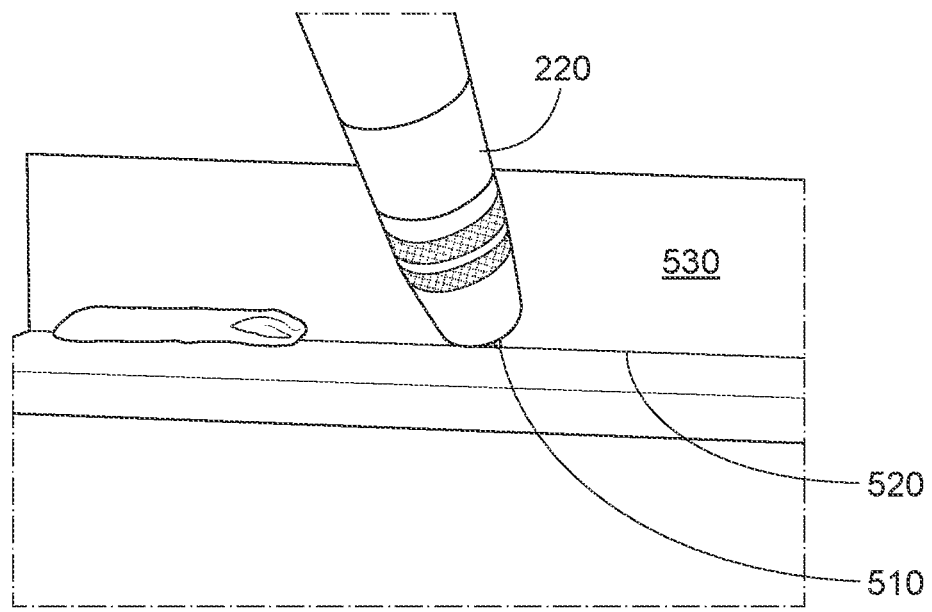
FIG. 8A illustrates the welding torch as corrected to the corrected/ideal push angle, with respect to the joint/seam of the work piece, by the robot of the welding system.
Figure 8B:
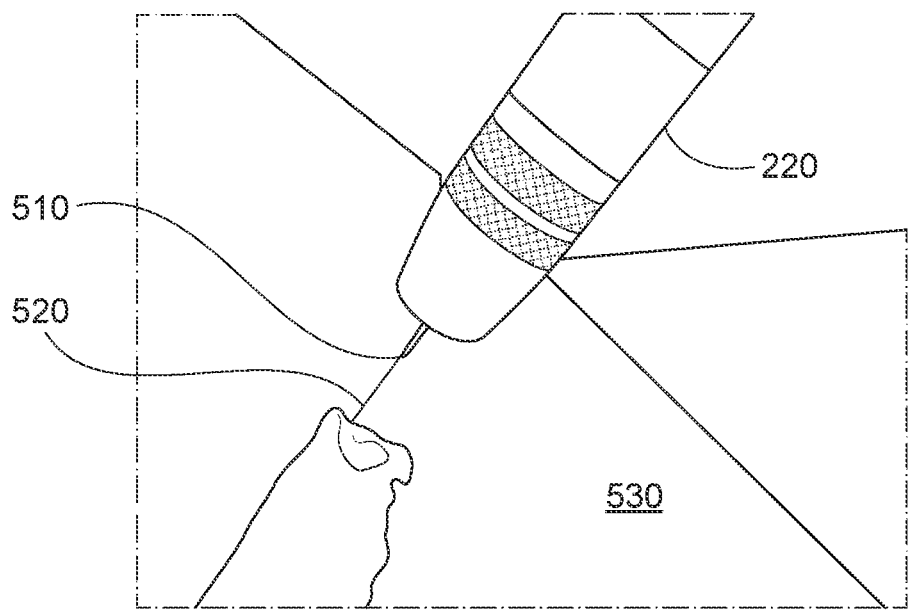
FIG. 8B illustrates the welding torch of FIG. 8A as corrected to the corrected ideal work angle, with respect to the joint/seam of the work piece, by the robot of the welding system.

The robot controller 320 may then command the robot arm 210 to re-position the welding torch 220 at the weld point 510, but with the corrected angles of 45 degrees and 10 degrees. FIG. 8A illustrates the welding torch 220 as corrected to the ideal push angle of 10 degrees, with respect to the joint/seam 520 of the work piece 530, by the robot of the welding system 100. FIG. 8B illustrates the welding torch 220 of FIG. 8A as corrected to the ideal work angle of 45 degrees, with respect to the joint/seam 520 of the work piece 530, by the robot of the welding system 100.

The weld angle correction tool 400 operates with the robotic welding system 100 in real time when teaching the robot. In this manner, a user can position the tip of a welding torch at a desired weld point in a weld joint/seam, and then use the weld angle correction tool 400 to adjust the angles of the welding torch to the ideal angles for that type of work piece having a particular type of weld joint/seam. Therefore, the user of the welding system does not have to have detailed welding knowledge of how to set the various angles of the welding torch.

Figure 9:
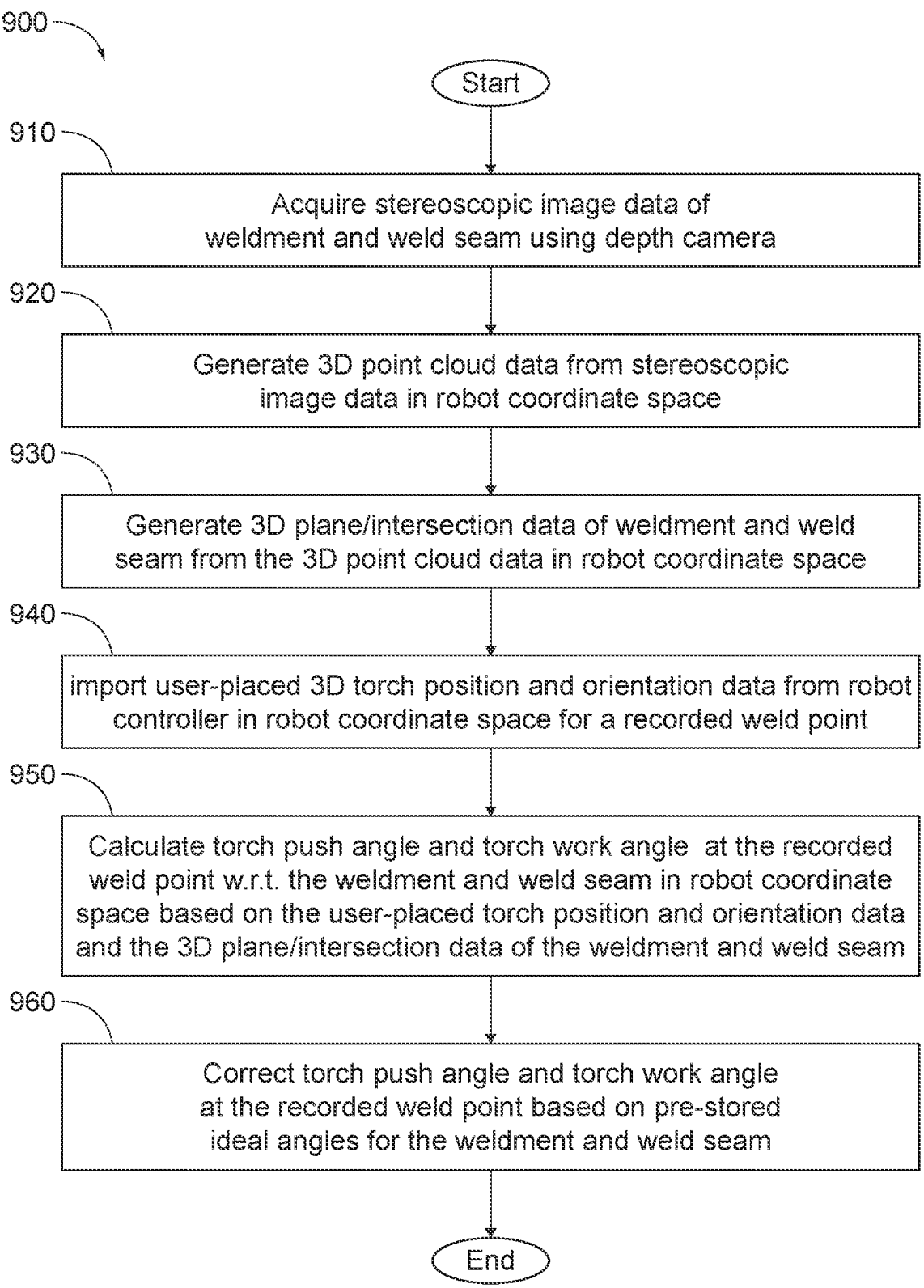
FIG. 9 is a flow chart of an embodiment of a method of correcting welding torch angles using the weld angle correction tool of FIG. 2 as operatively integrated with the welding system of FIG. 1.

FIG. 9 is a flow chart of an embodiment of a method 900 of correcting welding torch angles using the weld angle correction tool 400 of FIG. 2 as operatively integrated with the welding system 100 of FIG. 1. In general, a single stereoscopic depth image is used to reliably locate planes, plane intersections, and the extents of the plane intersection lines of the weldment and corresponding joint/seam in the 3D robot coordinate space. For example, in one embodiment, the weld angle correction tool uses one seam with two plane normals to calculate and display the current work angle, as set by the user, and also find the ideal work angle with respect to the joint/seam.

In step 910 of the method 900, stereoscopic image data of a weldment and its corresponding weld joint/seam are acquired using a depth camera of a weld angle correction tool. In step 920 of the method 900, a computer of the weld angle correction tool takes the stereoscopic image data and generates 3D point cloud data representing the weldment and its corresponding weld joint/seam in robot coordinate space. In step 930 of the method 900, the computer of the weld angle correction tool processes the 3D point cloud data to generate 3D plane and intersection data representative of the weldment and its corresponding weld joint/seam in robot coordinate space.

In step 940 of the method 900, the computer of the weld angle correction tool imports 3D torch position an orientation data from the robot controller. The 3D torch position and orientation data represent the position and orientation of the welding torch as positioned by the user at a recorded weld point along the weld joint/seam, in robot coordinate space. At step 950 of the method 900, the computer of the weld angle correction tool calculates a torch push angle and a torch work angle at the recorded weld point with respect to the weldment and its weld joint/seam in robot coordinate space. The computer of the weld angle correction tool uses the user-placed torch position and orientation data and the 3D plane and intersection data of the weldment and weld joint/seam to calculate the torch push angle and the torch work angle. At step 960 of the method 900, the robot controller, when commanded by the user via the weld angle correction tool, corrects the torch push angle and the torch weld angle at the recorded weld point with respect to the weldment and weld joint/seam based on pre-stored ideal angles for the weldment and its weld joint/seam. The ideal angles are stored in the robot controller, in accordance with one embodiment.

Other embodiments can provide additional capability as well. For example, in one embodiment, weld points can be defined by pointing the depth camera at the weld joint/seam and "clicking" on a point instead of moving the welding torch into the weld joint/seam. Furthermore, in a teach mode, the welding wire of the welding torch can be fully retracted and weld points can be taught to the system with the correct stickout using the depth camera, thus preventing the wire from being bent during teaching. Two-dimensional (2D) and three-dimensional (3D) wire search motion can be automatically defined using the detected planes. Inside corners at the start and end of a fillet weld can be detected and push angles can be modified to avoid crashing the robot into the weldment. The need for expensive, custom part fixturing can be eliminated by using AR guides to show the user where to place a part in front of the robot, and using the depth camera to teach features that accurately locate the part in space. In one embodiment, finding the intersection of three (3) seams can be used to quickly teach a part work object frame, allowing for easy program re-use between different robots, or making multiples of the same part. In one embodiment, small lap-joint seams can be detected and characterized using data acquired by the depth camera and an associated algorithm.

Figure 10:
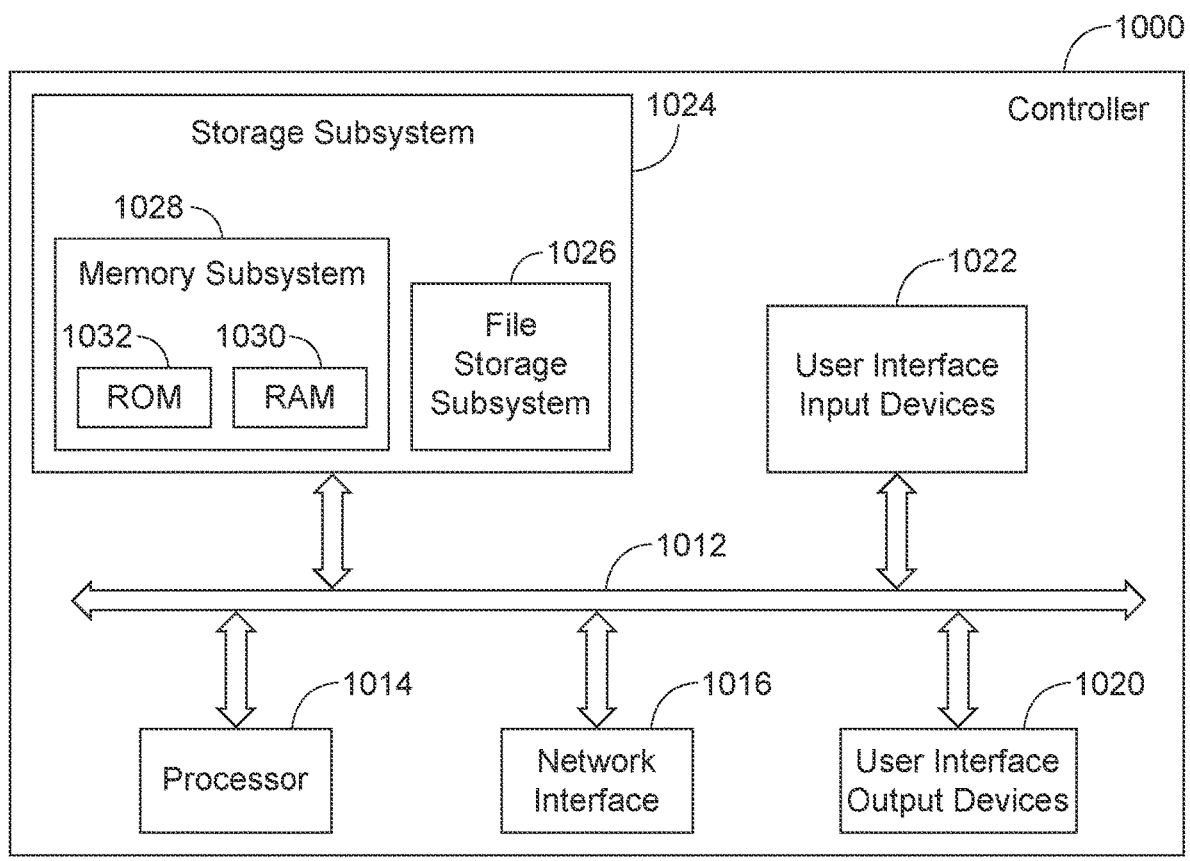
FIG. 10 illustrates a block diagram of an example embodiment of a controller that can be used, for example, in the welding system of FIG. 1.

FIG. 10 illustrates a block diagram of an example embodiment of a controller 1000 that can be used, for example, in the welding system 100 of FIG. 1. For example, the controller 1000 may be used as the robot controller 320 and/or as a controller in the welding power supply 310. Furthermore, the controller 1000 may be representative of the laptop computer 420 of FIG. 2, or of other computer platforms in other embodiments that perform much of the functionality of the weld angle correction tool 400.

Referring to FIG. 10, the controller 1000 includes at least one processor 1014 (e.g., a microprocessor, a central processing unit, a graphics processing unit) which communicates with a number of peripheral devices via bus subsystem 1012. These peripheral devices may include a storage subsystem 1024, including, for example, a memory subsystem 1028 and a file storage subsystem 1026, user interface input devices 1022, user interface output devices 1020, and a network interface subsystem 1016. The input and output devices allow user interaction with the controller 1000. Network interface subsystem 1016 provides an interface to outside networks and is coupled to corresponding interface devices in other devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 1000 or onto a communication network.

User interface output devices 1020 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 1000 to the user or to another machine or computer system.

Storage subsystem 1024 stores programming and data constructs that provide some or all of the functionality described herein. For example, computer-executable instructions and data are generally executed by processor 1014 alone or in combination with other processors. Memory 1028 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 1026 in the storage subsystem 1024, or in other machines accessible by the processor(s) 1014.

Bus subsystem 1012 provides a mechanism for letting the various components and subsystems of the controller 1000 communicate with each other as intended. Although bus subsystem 1012 is shown schematically as a single bus, alternative embodiments of the bus subsystem may use multiple buses.

The controller 1000 can be of varying types. Due to the ever-changing nature of computing devices and networks, the description of the controller 1000 depicted in FIG. 10 is intended only as a specific example for purposes of illustrating some embodiments. Many other configurations of a controller are possible, having more or fewer components than the controller 1000 depicted in FIG. 10.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A method of correcting angles of a welding torch positioned by a user while training a robot of a robotic welding system, the method comprising:
    acquiring a single image of weldment depth data of a weldment and a corresponding weld seam using a depth camera of a weld angle correction tool;
    processing the weldment depth data using the computer of the weld angle correction tool;
    importing user-placed 3D torch position and orientation data to the computer of the weld angle correction tool from a robot controller of a robotic welding system in a robot coordinate space for a recorded weld point along the corresponding weld seam;
    calculating, using the computer of the weld angle correction tool, at least one torch angle for the recorded weld point with respect to the weldment and the corresponding weld seam in the robot coordinate space based on the weldment depth data of the weldment and the corresponding weld seam, as processed by the computer of the weld angle correction tool, and the user-placed 3D torch position and orientation data; and
    correcting the at least one torch angle for the recorded weld point based on pre-stored ideal angles for the weldment and the corresponding weld seam.

2. The method of claim 1, wherein the weldment depth data is stereoscopic image data.

3. The method of claim 2, wherein the processing of the weldment depth data includes generating 3D point cloud data from the stereoscopic image data in the robot coordinate space using the computer of the weld angle correction tool.

4. The method of claim 3, wherein the processing of the weldment depth data includes generating 3D plane and intersection data representative of the weldment and the corresponding weld seam from the 3D point cloud data in the robot coordinate space using the computer of the weld angle correction tool.

5. The method of claim 1, wherein the at least one torch angle includes a torch push angle.

6. The method of claim 1, wherein the at least one torch angle includes a torch work angle.

7. The method of claim 1, wherein the weldment depth data is transmitted via at least one of a wired or a wireless means from the depth camera to the computer of the weld angle correction tool.

8. The method of claim 1, wherein the user-placed 3D torch position and orientation data is transmitted via at least one of a wired or a wireless means from the robot controller to the computer of the weld angle correction tool.

9. The method of claim 1, wherein a position of the depth camera is calibrated to one of a tip of the welding torch or a tool center point (TCP) of the robot.

10. The method of claim 1, wherein the computer of the weld angle correction tool uses matrix manipulation techniques, point cloud manipulation techniques, and feature recognition techniques as part of processing the weldment depth data.

11. A weld angle correction tool for correcting angles of a welding torch positioned by a user while training a robot of a robotic welding system, the weld angle correction tool comprising:
    a depth camera configured to acquire a single image of weldment depth data of a weldment and a corresponding weld seam to be welded by a robotic welding system having a welding torch; and
    a computer device configured to receive:
        the weldment depth data from the depth camera, and
        user-placed 3D torch position and orientation data from a robot controller of the robotic welding system for a recorded weld point along the corresponding weld seam,
    wherein the computer device is configured to:
        calculate at least one torch angle of the welding torch for the recorded weld point with respect to the weldment and the corresponding weld seam in a coordinate space of the robotic welding system based on the weldment depth data and the user-placed torch position and orientation data, and
calculate at least one corrected torch angle based on the at least one torch angle for the recorded weld point, as calculated, and pre-stored ideal angles for the weldment and the corresponding weld seam.

12. The weld angle correction tool of claim 11, wherein the weldment depth data is stereoscopic image data.

13. The weld angle correction tool of claim 12, wherein calculating of the at least one torch angle using the computer device includes generating 3D point cloud data from the stereoscopic image data in the coordinate space of the robotic welding system.

14. The weld angle correction tool of claim 13, wherein calculating of the at least one torch angle using the computer device includes generating 3D plane and intersection data representative of the weldment and the corresponding weld seam from the 3D point cloud data in the coordinate space of the robotic welding system.

15. The weld angle correction tool of claim 11, wherein the computer device is in the form of a laptop computer.

16. The weld angle correction tool of claim 11, wherein the computer device is integrated into the robot controller of the robotic welding system.

17. The weld angle correction tool of claim 11, wherein the computer device is integrated into a welding power supply of the robotic welding system.

18. The weld angle correction tool of claim 11, wherein the depth camera is configured to be removably attached to the welding torch.

19. The weld angle correction tool of claim 11, wherein the depth camera is configured to be mounted on joint 6 of a robot arm of the robotic welding system.

20. The weld angle correction tool of claim 11, wherein the depth camera includes two imaging apertures for acquiring stereoscopic image data.

* * * * *